US010664576B2

(12) United States Patent
Edelman et al.

(10) Patent No.: US 10,664,576 B2
(45) Date of Patent: May 26, 2020

(54) IDENTITY ASSURANCE METHOD

(71) Applicants: Darrin Edelman, Minneapolis, MN (US); Austin O'Brion, Minneapolis, MN (US); Kevin O'Brien, Minneapolis, MN (US)

(72) Inventors: Darrin Edelman, Minneapolis, MN (US); Austin O'Brion, Minneapolis, MN (US); Kevin O'Brien, Minneapolis, MN (US)

( * ) Notice: Subject to any disclaimer, the term of this patent is extended or adjusted under 35 U.S.C. 154(b) by 275 days.

(21) Appl. No.: 15/657,201

(22) Filed: Jul. 23, 2017

(65) Prior Publication Data

US 2018/0025140 A1 Jan. 25, 2018

Related U.S. Application Data

(60) Provisional application No. 62/366,023, filed on Jul. 24, 2016.

(51) Int. Cl.
| | |
|---|---|
| G06F 21/31 | (2013.01) |
| G06F 21/32 | (2013.01) |
| G06F 21/34 | (2013.01) |
| G06Q 20/40 | (2012.01) |
| G06F 21/33 | (2013.01) |
| G06F 21/45 | (2013.01) |
| G06F 3/0481 | (2013.01) |

(52) U.S. Cl.
CPC ............ *G06F 21/31* (2013.01); *G06F 21/313* (2013.01); *G06F 21/316* (2013.01); *G06F 21/32* (2013.01); *G06F 21/33* (2013.01); *G06F 21/34* (2013.01); *G06F 21/45* (2013.01); *G06Q 20/4014* (2013.01); *G06Q 20/4016* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 9,292,830 B2 * | 3/2016 | Fleet ...................... G06Q 10/10 |
| 10,135,835 B1 * | 11/2018 | Kandel .................. G06F 21/40 |
| 2011/0046969 A1 * | 2/2011 | Carlson .................. G06Q 20/10 705/1.1 |
| 2011/0307957 A1 * | 12/2011 | Barcelo ................. G06F 21/552 726/25 |
| 2012/0095977 A1 * | 4/2012 | Levin .................. G06F 16/9535 707/706 |
| 2012/0117626 A1 * | 5/2012 | Yates .................... H04L 9/3213 726/4 |

(Continued)

*Primary Examiner* — Kaveh Abrishamkar

(57) ABSTRACT

Provided are computer-implemented methods and systems used in assuring a person's identity that include the steps of receiving from the person one or more identifying statements and receiving from the person authorization to access one or more identity sources on which the person is registered. Data is then extracted from one or more of the identity sources to corroborate the one or more identifying statements, and the data aggregated to provide first and second scores, the first score representing factors that tend to affirm the person's identifying statements and the second score representing factors that tend to disaffirm the person's identifying statements. Optionally, the scores are displayed in a graphical user interface.

19 Claims, 8 Drawing Sheets

(56) References Cited

U.S. PATENT DOCUMENTS

| | | | |
|---|---|---|---|
| 2012/0123821 A1* | 5/2012 | Rickman | G06Q 10/0635 |
| | | | 705/7.28 |
| 2012/0198535 A1* | 8/2012 | Oberheide | H04L 63/0272 |
| | | | 726/9 |
| 2014/0214670 A1* | 7/2014 | McKenna | G06Q 20/40145 |
| | | | 705/44 |
| 2014/0282930 A1* | 9/2014 | Markwordt | G06Q 20/4014 |
| | | | 726/5 |
| 2014/0379902 A1* | 12/2014 | Wan | H04L 41/142 |
| | | | 709/224 |
| 2016/0004852 A1* | 1/2016 | McEvoy | H04L 51/28 |
| | | | 726/7 |
| 2018/0359811 A1* | 12/2018 | Verzun | H04L 12/28 |

* cited by examiner

IDENTITY ASSURANCE METHOD

TECHNICAL FIELD

Provided are methods of assuring an online identity. These methods may be useful, for example, in assuring an online identity to facilitate an online transaction.

BACKGROUND

The world that has come to be dominated by online marketplaces in which hundreds of billions of personal and business transactions take place over the internet daily. In our modern day "sharing economy," peer-to-peer based sharing of access to goods and services have become prevalent. These types of transactions take place alongside others that are business-to-consumer, rather than peer-to-peer.

It has always been difficult to ascertain the identity of a particular person (e.g., a human or online company). Unless one has previously met the person in circumstances that assures that person's identity or the person is vouched for by another trusted individual, there is little assurance that a given person is really who she says she is. This problem is especially confounding with respect to peer-to-peer transactions between individuals in which the pool of potential buyers or sellers is extremely large.

Society has dealt with this problem over the years by providing the person whose identity may be questioned identifying papers, a badge, identification card, or even a uniform. All of these means may be easily compromised, however.

Recent technology has offered other solutions to assure identity, such as retinal scans, DNA analysis, fingerprinting, or facial recognition software. These systems work but are often impractical when dealing with other parties through the Internet and, more often than not, across long distances.

Another similar solution uses a "challenge" question scheme to determine whether a person logging onto, for example, a remote banking system should be trusted. In a prior initialization session with a bank, for example, the person initially creates a set of challenge questions. When the person later tries to log on to the bank system from a remote and unknown computer, before they are passed through to the system, the untrusted person is requested to answer these challenge questions and enter a password. It remains relatively easy, however, for some to defeat these security measures because it is merely based on information, which may be disclosed to, stolen by others or obtained from public sources or through some combination thereof. To combat this problem challenge questions have become more and more difficult to answer. People cannot always remember distant facts and sometimes those trying to infiltrate are able to answer these questions with ease.

Additionally, the verification service is set up by the bank itself and cannot be used by other entities to establish trust, nor can this information be adapted for use of additional questions such as: "Will this person repay a loan?" or "Is this person qualified to be a plumber?

For the foregoing reasons, a solution that can easily and reliably provide a satisfactory level of assurance is still needed.

SUMMARY

One potential approach to this problem involves two or more people creating accounts on an identity assurance system to establish trust to complete a transaction. This can be problematic, however, because generally one of the untrusted parties recommends the system as a means to establish trust. Because the untrusted party recommended the system, the system is often not trusted.

This is solved by having the system act as an intermediary to establish trust within the context of a commonly trusted identity source, such as an online community. To earn trust of the system, the community can be empowered to provide the system with the identity of the people involved in the transaction. This can be accomplished by identifying statements, which are incorporated into a reputation model and used to corroborate the provided identities with the identity sources.

The methods herein provide ways to assure a person's identity by first defining an identity based on one or more identifying statements. These identifying statements may be corroborated with a first identity source. Subsequently, identifying statements may be corroborated with additional sources to further establish a level of confidence that the identity is consistent with the identifying statements. In essence, the provided methods combine disparate pieces of information from different sources related to an identity into a model that may be used to provide an assessment of identity assurance. Advantageously, such an assessment may be provided in a way that facilitates decision-making and automation.

In a first aspect, a computer-implemented method of assuring a person's identity is provided. The method comprises the steps of: receiving from the person one or more identifying statements; receiving from the person authorization to access one or more identity sources on which the person is registered; extracting data from the one or more identity sources to corroborate the one or more identifying statements; aggregating the data to provide first and second scores, the first score representing factors that tend to affirm the person's identifying statements and the second score representing factors that tend to disaffirm the person's identifying statements; and displaying the first and second scores in a graphical user interface.

In a second aspect, a computer-implemented method of displaying a person's identity is provided comprising the steps of: using the aforementioned method to obtain first and second scores, the first score representing the number of factors that tend to affirm the person's identity and the second score representing the number of factors that tend to disaffirm the person's identity; representing the data in a graphical user interface comprising: optionally, a profile image representing the person; and a graphical representation of the first and second scores.

In a third aspect, a computer system is provided, comprising: a graphical user interface for displaying a level of confidence in a person's identity, the graphical user interface comprising: optionally, a profile image representing the person; and a graphical representation of respective first and second scores obtained using the method of claim 1, the first score representing the number of factors that tend to affirm the person's identity and the second score representing the number of factors that tend to disaffirm the person's identity.

In a fourth aspect, an application programming interface is provided to implement or carry out the aforementioned methods. This interface can allow:

third parties to submit a set of Identifying Statements;
people within their community the ability to opt-into adding their Token of Trust profile to the third party website or apps;

a safe and secure method to display Token of Trust widgets making forgery and theft of credentials much more difficult; and/or extraction of a Reputation Report that offers reasons that affirm or disaffirm their identity statements.

In a fifth aspect, an application programming interface is provided to allow third party services to make decisions about rendering goods or services based on identity/confidence scores derived from the identity statements.

DEFINITIONS

Figure 1A:
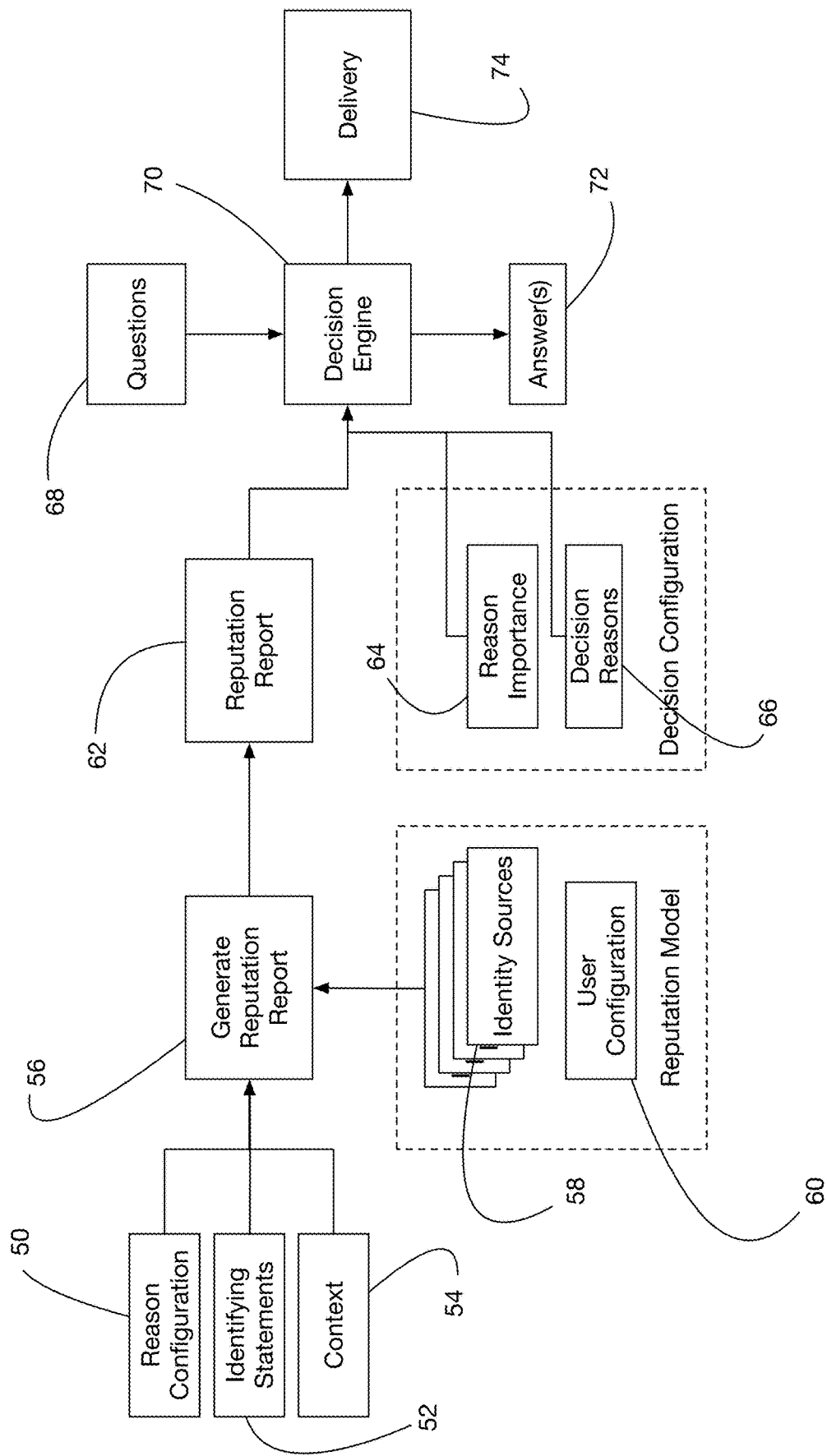
FIGS. 1A and 1B are block diagrams showing an exemplary process for obtaining an assurance of a person's identity and answering questions about that identity.

As used herein:

"identifying statement" refers to a factual assertion made in regards to a person's identity;

"identity source" refers to a source of information relating to a person's identity;

and "person" refers to a human being or a business entity treated as having rights and obligations thereof.

DETAILED DESCRIPTION

Described herein are exemplary embodiments, shown with reference to the accompanying drawings. This invention may be embodied in many different forms and should not be construed as limited to the embodiments set forth herein; rather, these embodiments are provided so that this disclosure will be thorough and complete, and will fully convey the scope of the invention to those skilled in the art.

Reputation Framework

This disclosure relates to computer-implemented methods on a computer-implemented system (hereinafter, "the system") that combines disparate pieces of information from different sources related to a given identity into a model that may provide assurance of that identity and optionally provide further information relevant to the person's reputation. Use cases related to these methods include identity assurance, fraud detection, support of statements, overall reliability, and sentiment analysis.

In some embodiments, users interact with the provided system by providing credentials to a third party application (e.g., Facebook), whereby the user obtains authorization to share information with the system. The system can gather data and assemble and store reputation reports. The system is comprised of components that can be located on remote servers, local servers and/or local devices.

In some embodiments, the provided methods can be carried out using a computer system on a web-based graphical user interface. The user can interact with the system via a client computer, which generally includes a processor, input device, memory, and display device.

The primary context for which the technology was conceived was for remote identity assurance however it has been further adapted to remotely affirm or deny individual facets of a person's identity. For example it may be used to help answer "Is this person likely to repay a loan?" or "Is this person qualified to be a plumber?" These questions often start with identity assurance and then move into questions about behavior, skill, or confirmation of stated claims.

The Reputation Framework can be used to help inform decisions in any domain by asking a different set of questions (e.g. in the first step below) and ascribing a different level of importance to the factors/reasons presented in the resulting Reputation Report.

In exemplary embodiments, the Reputation Framework follows the general process below:

For a given problem what primary questions require answers? (Note: these may be hierarchical in nature.)

Some Example Questions might be:

Is this person real?

Can I trust this person?

And to help answer the these primary questions, additional questions might be asked and so on with more potential questions being asked for each new question. e.g. for the questions above the answers to questions might be relevant:

Is this person who they say they are?

Do they live where they say they live?

Do they have the training/education they claim?

Did this person work where they claimed?

Is this person a good driver?

To answer questions pieces of evidence by be presented. (Note: evidence may be hierarchical in nature and of varying levels of confidence.) e.g.:

Is this person I met online a trustworthy plumber?

Do they have evidence of a consistent online presence?

Can they provide evidence that they own one or more social networks?

Example Evidence: Proof that they can they log into Facebook, Paypal, LinkedIn.

Does the name on the social network match their stated name?

Example Evidence: The name on the account matches.

Example Evidence: The name on the account partially matches.

Is this a valid social account?

Example Evidence: 177 documented contacts.

Example Evidence: 17 documented contacts with whom they've demonstrated interaction.

Is there any evidence that this account has been compromised?

Example Evidence: The account is still active and in good standing.

Example Evidence: Unable to find account on blacklist.

Is there evidence it has been used recently.

Example Evidence: Demonstrated ability to log in within the last 7 days.

Has it been around for a long time or was it set up yesterday?

Example Evidence: Transactional evidence dating back 14 months.

Example Evidence: Account open date confirmed to be 18 months ago.

Do they have a useable credit card?
    Example Evidence: a small charge was placed on the card indicating that it is valid and active.
    Example Evidence: Valid card number.
    Example Evidence: Name on the card matches location.
    Example Evidence: Card matches their name.
Do they have a real world presence?
    Example Evidence: Valid Photo ID.
    Example Evidence: Valid Driver's Licence or Passport number.
    Example Evidence: The identity match the name and location claimed
Then enumerate each pieces of evidence found and what level of confidence can be ascribed to each?
    These may be used to add positive/negative reasons to the Model/Reputation Report.
Then enumerate important pieces of evidence that are absent.
    Sometimes the person cannot prove or chooses not to prove the factors important to the reason. The lack of evidence in these cases often make sense to weight into the decision.
        These are generally reasons to be careful but can also be builders of confidence for example:
        Reason to Be Careful: this person has not undergone a criminal background check.
        Builder of Confidence: this person has undergone a criminal background check (across 3 counties reflected in address history) which came back with no records of criminal activity.
Then assembles a Reputation Report which enumerates factors/'reasons'
    As documented in 'Generating a Reputation Report' above.
Then answer each question and report the result.
    Was the evidence positive, negative or neutral in terms of answering the posed question(s)?
    How important is each piece of evidence?
        The System can characterize a measure of importance through a weighting applied to any given factor in the decision.
    How likely is the evidence to be accurate/spoofed given what is known of how the data was collected?
        The System can characterize a measure of this through a level of confidence or 'confidence'.
While people start with the question in mind, the system starts with building a model of the person or subject (see 'Building a Reputation Model'). Given this the system compares this Reputation Model against a set of Identifying Statements, along with the Context in which the comparison is being tested (see 'Generating a Reputation Report').

The result of this comparison is a Reputation Report that contains enumerated pieces of evidence and conclusions that have been drawn. Now given a Question the system can weight the importance of the conclusions drawn within the Reputation Report to elevate the most important factors to consider when answering the Question and to formulate probabilities, likelihoods or scores with which the system can help assist in Answering the Questions asked (see 'Decision Making').

Building a Reputation Model

The process begins with the creation of a Reputation Model. A Reputation Model is a combination of User Configuration and a collection of data extracted from one or more Identity Sources for a person. The data extracted can reflect for example the person's social identity, financial identity and/or legal identity.

Inputs

User Configuration (Block 60)
    User supplied information and/or settings that can impact the level of information shared by the model, privacy settings, e.g. passwords and the like.

Identity Sources (Block 58)
    In some embodiments, an Identity Source is a full or partial identity or alias on an account, claimed by a person and used to conduct business or personal interactions online or offline, in person or remotely. Identity Sources can be pre-determined or dynamically defined.

In some embodiments, the Identity Sources provide information directed to one or more of the following:
    Age
    Location
    Employment
        Work History
        Current Employer
    Experience
        Skills, etc.
    Disposition
        e.g. personality type via sentiment analysis of writing
    Appearance
        e.g. photos.
    Transactions/Events
        e.g. financial activity: purchases, loans, repayment history
        e.g. social activity: confirmed or unconfirmed sightings of a person, activity on a social account
        e.g. outcomes of transactions: ratings, reviews, performance metrics Identity Sources can come from a wide range of different online and offline agencies, companies, entities, services, and apps. They may be government issued identities, identities issued by third parties or even self-proclaimed classifications. They are of varying degrees of quality, credibility, veracity and are secured and verified in varying ways and with varying degrees of confidence.

Any place an individual leaves a documented trace of their presence or can demonstrate some level of belonging can be used as an Identity Source. Identity Sources may be online or offline. A statement of ownership of a particular form of Identity Source may itself be used as an Identity Source.

Examples of Identity Sources include:
    Social Network Sites such as those provided by Facebook, Instagram and Twitter
    Professional Networking Sites such as those provided by LinkedIn, Quora and Indeed
    Blogs and News Sites such as those provided by Google and Medium.
    Online and Offline Memberships and Accounts such as those provided by Match.com and other online auction sites (e.g., E-Bay), book clubs (e.g., GoodReads), accounts on dating websites (e.g., Match.com, Tinder or OkCupid.com), accounts on classifieds websites (e.g., Craigslist).
    Demonstrated ownership over Web Sites or Web Pages: such as online classified listings (such as those listed on Craigslist), advertisements for services (such as those listed on Angie's List), blog pages or news sites (such as Medium and Blogger), social websites and services (such as Facebook).

Government Identities e.g., Driver's License, Passports, Legal Paperwork, Voter ID Cards, Personal Identity Cards Government Issued documents and records e.g., tax documents, titles and articles of incorporation.

Non-Government Issued documents e.g., utility bills and bank statements

Unofficial Identities e.g., Library Cards, Club Membership Cards and Loyalty Cards.

Online and Offline Credentials and Certificates such as those provided by Pearson VUE as well as graduation diplomas and training certificates.

Publicly available materials including: photographs, writing samples, and controlled web pages and web sites.

Privately available materials, including for example photographs, writing samples, and controlled web pages and web sites.

Transaction Histories or documented sequence of events such as those provided by a bank (e.g. account history), credit card company (e.g. purchase and payment history), Facebook (e.g. social feed) or a Credit Agency (e.g. credit history).

A digital identity verified using blockchain, distributed ledger, cryptographic signature, public-key exchange or other electronic identity system.

Community Identity, such as those provided by any online or offline source that allowing third party to access a person's data, either with or without permission (i.e., a community site). Such sources can include any service that allows access to a given person's data. Examples include services that use OAUTH or OpenID (e.g., Facebook, Twitter, and Paypal) and services that use other mechanisms to allow access to a person's data (e.g., APIs the use public and private key pairs).

Unique Attributes or Identifiers such as email addresses, phone numbers, usernames, user IDs, driver's license numbers, passport numbers, license plate numbers or unique identifiers, keys or access tokens proving ownership of digital identities.

Identity Profiles, Scores or Analyses—such as those provided by third parties and services that can be used to aide in determining the veracity of Identity Sources or individual factors incorporated into the model. This includes but is not limited to commercial means to assess identity, confidence in whether a person is real, whether a given fact is true, assessments of personality, sentiment or disposition, indicators of stress or duress.

Ratings and Reviews, Testimonials and measures of performance from people as well as third party sites and services.

Self-proclamations of identity including but not limited to a claim of the possession of a name, birthdate, and stated relationships.

Biological and Chemical Sources of identity such as DNA, retinal scans, fingerprints, and the like.

Offline sources of information that are photographed, scanned or otherwise made available to the system that indicates any form of Identity, Certification, License, Voter Registration, Birth Certificate, Social Security Number or the existence of digital claim of ownership of any of the same along with optional certification by a third party in the verification of the same.

Any combination or portion of the above examples.

Mechanisms & Process

A Reputation Model begins with a single Identity Source. Starting with the first and each successive addition of an Identity Source, data is added to the Reputation Model. Each time an Identity Source is added it can impact the enumerated reasons that are generated for derived Reputation Reports. Likewise it is possible for the data reported for any Identity Source to change at any time. Because of this the system can recalculate the Reputation Model (re-aggregating the data and recalculating results) each time there is a change to Identity Sources and/or related data (block 108).

Some Identity Sources are publicly available (thus the system has implicit authorization to access) and some require end users to grant access to their data. Access to private Identity Sources may require authorization from the person to access (block 104). Data may or may not be extracted when Identity Sources if necessary in order to evaluate the Identifying Statements (block 106) and as evidence to help provide Answers (block 72).

Note that measures are used to prove control and grant access to the person's data can be taken into account when enumerating the reasons that tend to either affirm or disaffirm the person's identity (within the Reputation Report below).

As mentioned—in some embodiments, a person seeking to add an Identity Source may be required to provide proof of ownership, as described above, and if necessary authorization to allow access to data related to the Identity Source. Identity Sources may also be subject to tests which will typically increase confidence that the source is valid and active.

The data related to the Identity Source can be used to corroborate various types of identifying statements, including those reflecting, for example: legal identities, financial identities, social identities, and community identities. Aspects of each of these are shown below, along with their respective tests.

Legal Identity
  ownership test 1: physical possession of government photo ID (e.g. driver's license, passport), or legal documents (SSN card, voter ID card)
  ownership test 2: photo/photocopy of 1 above.
  validity test: of validity with third party verification service.
Financial Identity
  ownership test: ability to present credit card, bank account numbers
  validity test: successful charge, payment
Social Identity
  ownership test: opt-in from client site which generally requires log-in
  validity test: social network with identifying information, immutable account age or transaction history (e.g. Facebook™, Google+™, and PayPal™) along with details and activities that show consistency with identifying statements, demonstrated activity, demonstrated interest in posted activities from connections/friends
Community Identity
  ownership test: opt-in from client site which generally requires log-in
  test: community data matches previously established facts Another factor that can be used in determining the first and second scores in the Reputation Model is whether the person is reachable and responsive to inquiries by others. Ways in which this factor can be probed include confirmation by location, email, SMS (Short Message Service) and phone. Some examples include:

Location Confirmation
  ownership test: via receiving a postcard or other mail within reasonable timeframe test: via sending a person to go out and observing that person is physically present at a location Email Confirmation
test: receives and responds to a message delivered to a given email address within reasonable timeframe SMS Confirmation
ownership/test: controls and responds to a given SMS phone number within reasonable timeframe Voice/Phone Number Confirmation
ownership/test: person answers a given phone number (optionally can confirm personal details without significant delays).

Evidence of positive activity can also be used to inform the Reputation Model. Examples of such positive activities are below:

Reviews from Reliable Sources
via: reviews from registered users on the provided system, or other networks that tie reviews to a reliably traceable source
test: positive reviews from others on one or more Identity Sources (note that here the level of confidence in the validity of the review may be weighted by the reviewer's reputation of the review could be dependent upon the reviewers reputation).

Traditionally Positive Activities
via: credit rating
test: report from credit agency Transactional records—here the system has a wide range of data—these are not mutually exclusive:
a) social activity
via: posts
test: likes, comments
b) physical location logging
via: device GPS, photo geolocation, browser geolocation, photo with landmark
test: likes, comments
c) behavioral analysis
via: posts
test: analysis of posts to determine sentiment, behavior, etc.
d) financial history
via: bank records or credit card statements
test: analysis of incomes vs expeditures, or loan schedules vs actual repayment After the collection and assembly of Identifying Sources is complete, an overall profile or Reputation Model (block 102) is created.

Outputs

Reputation Model

The Reputation Model includes the collection of Identity Sources and extracted data and can be used to indicate whether or not evidence tends to support a set of Identifying Statements by way of generating a Reputation Report (block 62).

Generating a Reputation Report

When combined with Identifying Statements the Reputation Model can be used to create an enumerated set of factors (i.e., reasons) that tend to either affirm or disaffirm the person's identity, representing a Reputation Report.

The same Reputation Model may be used with any number of alternative or supplemental sets of Identifying Statements to create alternative or supplemental Reputation Reports. Each combination of Identifying Statement and Reputation Model results in the creation of a corresponding Reputation Report.

As an example of the use of different Identifying Statements, consider a system which allows a user to belong to multiple communities each with a different set of Identifying Statements (e.g. in community. In this example, a different Reputation Report is published for each community the user belongs to because while the user reuses their Reputation Model their Initial Statements are different.

Advantageously, while this particular process is concerned with verifying the Identifying Statements, this approach may be generalized to prove or disprove general facts about the person (see 'Questions', 'Decisions').

Inputs

Reasons Configuration (Block 50)

A configuration that describes what kind of reasoning needs to be done. This can be used to turn on/off special types of reasoning depending upon the application. Likewise this might include inputs or parameters used to configure specific reasons or in some embodiments these parameters could be determined algorithmically or via machine learning.

Identifying Statements (Block 52)

An Identity Source may be used to provide one or more Identifying Statements about the person if an Identity Source is added to a Reputation Model prior to receiving one or more Identifying Statements about the person.

Context (Block 54)

Captures environmental conditions such as whether the user is present virtually, physically or not at all, what app or service is the report being generated for, what permissions has the user granted, what method of access was used to request the generation of the reputation report and at what time of day. These conditions may be used in the evaluation of reasons (as described in Outputs below).

Mechanisms & Process

Figure 1B:
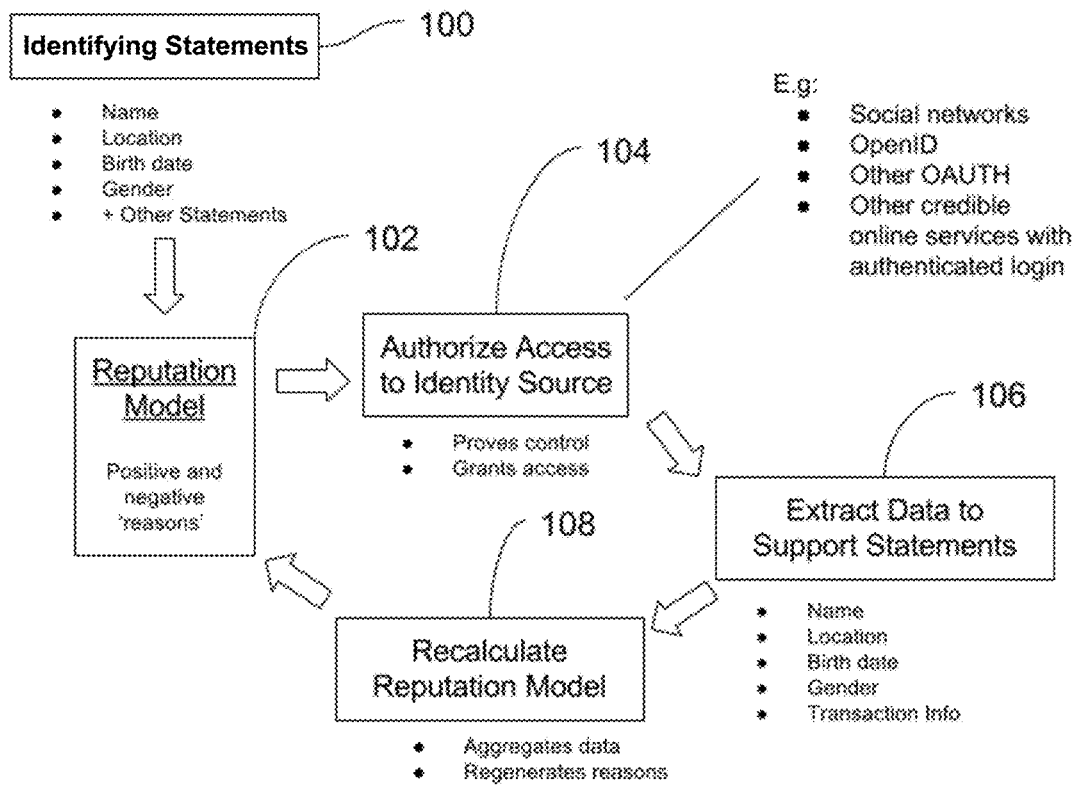

In block 100, the person whose identity is at issue begins by establishing a profile. In this embodiment this process begins with identity based on one or more Identifying Statements that the system is trying to prove about the person. The Identifying Statements represent identity-related attributes and can include, but are not limited to:

Name—(First, Last, Middle)
Birthdate
Gender
Location (could be many)
  of residence
  of work
  of home town
Physical appearance—via photos FIG. 1B also refers to Other Statements that can represent other factual statements. Examples include: Address History, Name History/Aliases, Past Behavior/Transactions (e.g. they were a tenant, they paid their rent on these dates), Past Transaction Performance (e.g. they were a good tenant, they paid their loans on time), Criminal History, Tests Results, Survey Results, Work history, Sex Offender Status, Ability to Drive, Driving Record, Marital Status, educational background, employment history, relationship/connection to others, skills in which they've demonstrated expertise or accreditation.

Each time an input to a Reputation Report is changed the Reputation Report is preferably regenerated. This can happen if for example the Reputation Model is changed (e.g. when an Identity Source is updated or added) or the Identifying Statement is updated (e.g. for a change of address).

FIG. 1B shows an exemplary high-level process used to obtain assurance of a person's identity through a Reputation Model and to illuminate aspects that are pertinent to the person's reputation in conducting, for example, online transactions.

Changes to the Reputation Reports may be captured with a version history along with reason for change—formulating a historical record that can reviewed or audited. Additionally notifications related to the change may be forwarded to interested parties to facilitate automation or time sensitive uses of these verification results. For example: the timely report of fraud related to an email address or phone number could result in an updated Reputation Report and notification that could stop a money transfer from happening. In another example: an end user can be asked if they're authorizing a high value purchase before allowing it to go through on their protected account.

As shown in FIG. 1B, this process can be repeated from here any number of times to further refine the Reputation Model through the inclusion of information derived from additional Identity Sources or changes to included Identity Sources.

The Identifying Statements, Identity Sources, Reputation Models and derived Reputation Reports may be assembled through various methods including but not limited to human judgement, algorithmic or machine learning. Reasons included in any Reputation Model and derived Reputation Reports may vary depending upon the use case, domain, Identifying Statements, configuration, Identification Sources.

In preferred embodiments, the system builds a Reputation Report by combining disparate pieces of information from different Identity Sources to assemble evidence that can be used to support the one or more Identifying Statements. Identity Sources can include, for example, data assembled from online social profiles, real world identity verifications, transactions (purchases, third party activity) and data from communities to which the person belongs.

Figure 2:
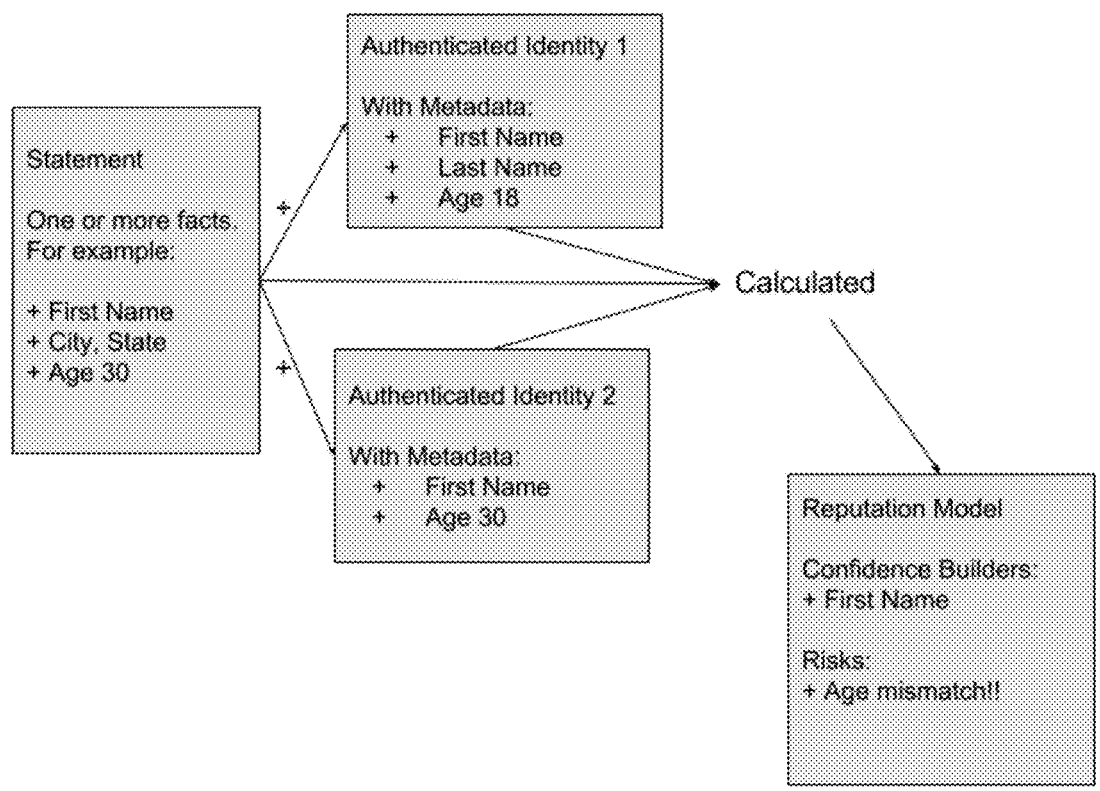
FIGS. 2 and 3 are block diagrams showing a sub-process for obtaining assurance of a person's identity.
Figure 3:
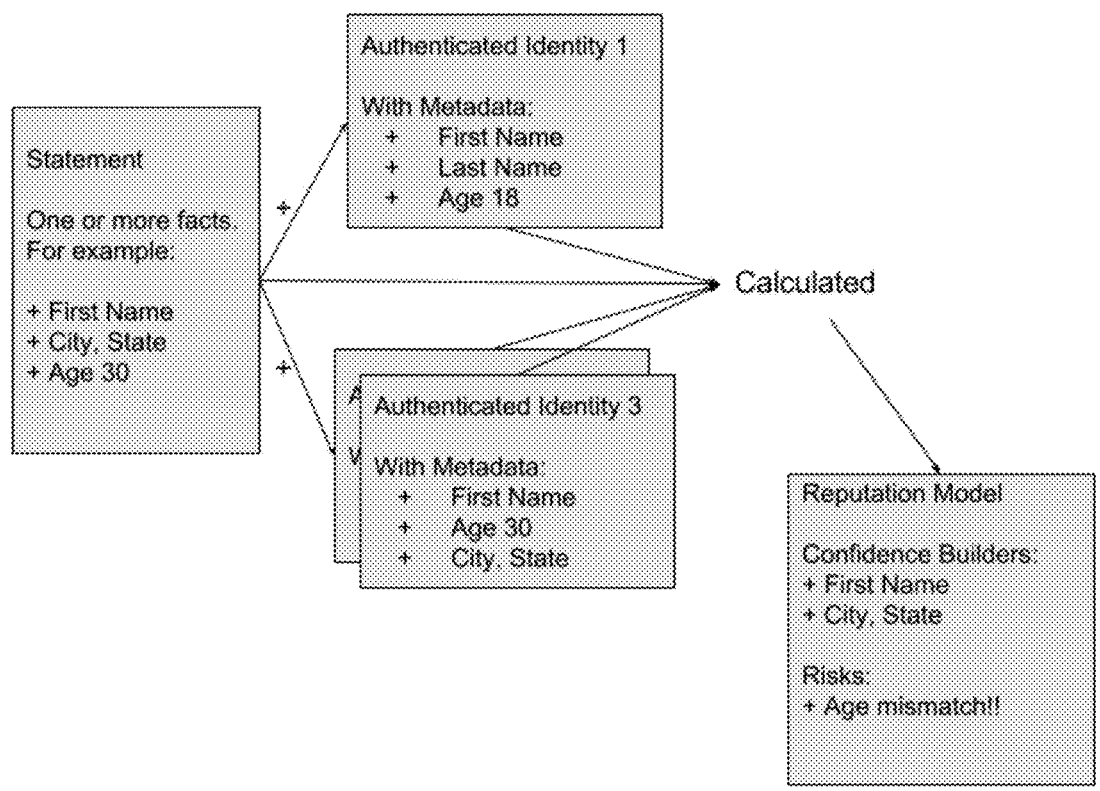

Logical ties between disparate pieces of information are transformed into enumerated reasons, referred to here under either 'builders of confidence' (i.e., confidence builders) or reasons to be careful (i.e., risks)—see, for example, the screenshots of FIGS. 2 and 3. In some embodiments, these reasons are rendered anonymous to facilitate the safe sharing of this information with others.

The recalculation of the Reputation Model and derived Reputation Report may be thought of as the execution of a series of logical tests—though in fact recalculation may be by any means including human judgement, sensory measurement, computational algorithm, machine learning, chemical reaction or random chance.

Different levels of confidence are ascribed to the results of different tests, because there are varying degrees of difficulty required to fool these tests. These, in turn, impact the reasoning provided to the user of the system and overall confidence in trying to prove the Identifying Statements made by the person. Further, the results of individual tests could be aggregated in various ways to establish a score that expresses the appropriate level of confidence of ownership with respect to the person's identity.

The system may characterize the confidence that any given factor (reason') is true by assigning a relative confidence. This could be done via a numeric value or as here though a coarse grained rating system:

Very Low (VL)—very easily spoofed, fooled or copied or a common avenue from whence fraudulent attacks originate.
Low (L)—easily spoofed, fooled or copied.
Moderate (M)—not easily spoofed, fooled or copied.
High (H)—very hard to spoof, fool or copy.
Very High (V)—nearly impossible to spoof, fool or copy The confidence of each factor (or 'reason') may be determined via any means and is considered an input to the system and may evolve over time as technology changes and as more is learned about the most reliable ways of collecting and providing data.

The exact nature, number and types of reasons is expected to evolve over time. As previously mentioned they may be positive, neutral or negative in nature when considered against a set of Identifying Statements. These reasons are not considered equally—some are easily spoofed, others are not. The real power of the solution is the combination of factors that are claimed across a variety of Identity Sources. Given a single source of identity it is hard to be certain of another's identity but repeated and recurring examples a given statement across multiple Identity Sources builds a picture that is more difficult to build synthetically.

As an example, various methods can be used to show ownership of identity and each method may have a level of confidence to help assess the degree to which that method is weighted in the decision-making process. Here the system might use multiple Identity Sources to build a case that a person is who they say they are. Each factor is considered individually, factors are enumerated and then aggregated upward into higher level "reasons" which may then impact the level of confidence in that reason.

The wide range of Identity Sources employ a correspondingly wide range of methods to determine ownership of the identity. These methods may be one of the factors taken into account when determining confidence. Methods of confirming identity are not particularly limited and may include, for example a biological or physical identifier, control over a social account, control over a personal device, extent of the person's knowledge of facts, method of access to the system or some combination of the above.

Some examples of tests that might inform confidence associated with these factors, along with their associated levels of confidence, are enumerated below:

a) Biological/physical identifier
  test: facial recognition (V), retinal scan (V), fingerprint (V)
  test: photos human checking of photo ID (looks like them) (L)
b) Control over social accounts
  test: ability to log into already proven owned email accounts (M)
  test: ability to log into already proven owned social accounts (H)
  test: ability to log into already proven owned accounts that are secured with multiple factors and those factors are recent and up to date (V)
c) Control over a personal device
  test: prove ownership and possession of existing device (SMS, cellular phone, personal computer, physical address) (H)
d) Extent of knowledge
  test: ability to recall previously established facts (already in profile) that only the person would know (M)
  test: ability to recall previously established facts that are of public record (L)
  test: demonstration of ability to properly execute a give process (depends—H-VL)
e) Method of Access
  test: access via a public computer (VL)
  test: access via a distant previously proven personal device (M)

test: access via a local previously proven personal device and follow-up confirmation via a 2nd factor or challenge question (e.g. SMS, email) (VH)

f) Combination test: access via a local previously proven personal device and follow-up confirmation via a challenge question (VH)

FIG. 2 shows an example where two sources of information are provided to support the claimed first name, city, state and age. In the scenario depicted in this figure, the algorithm detected one confidence builder (a corroborated name) and one risk (a mismatched age).

FIG. 3 shows the addition of another authenticated identity, which can be added at any time to support statements made by the person. This authenticated identity adds City and State information which helps to corroborate information supplied in the initial identifying statement and provides the system with an additional confidence builder.

Outputs

Reputation Report (Block 62)

A primary output of the process is the aforementioned Reputation Report, which provides an enumerated set of factors (i.e., reasons) that tend to either affirm or disaffirm the person's identity.

The reasons within a Reputation Report are broadly broken into three categories: positive, negative and neutral statements with respect to their tendency to affirm the person's Identifying Statements.

Examples of Positive/Affirming Reasons:

This person has proven within the last week that they have ownership and control of a Facebook (FB) account and that That FB account is 5 or more years old.

That FB account has been linked to a mobile phone.

The name indicated on the FB account fully matches to the name presented in their Initial Statements.

The name indicated on the FB account partially matches to the name presented in their Initial Statements (marginally positive)

This person has a criminal background check available.

This person has no criminal activity on their criminal background check.

This person is a certified Java Expert as demonstrated through their completion of the 'Java Expert' certification with Oracle Inc.

This person has proven that they own a given (postal, email or phone) address because they responded to a message sent there.

This person has proven that they own a given domain or web page because they have added a code supplied by Token of Trust to that page to demonstrate control of the site or page.

This person has confirmed social activity at or near a given location via (social media, ip address, reported gps coordinates).

Examples of Negative/Dis-Affirming Reasons:

This person's identifying information appears to match that of a person listed by the Office of Foreign Assets Control (OFAC).

This person has (or does not have) a criminal background check available.

This person failed to confirm they own a given postal, email or phone address after 3 attempts to confirm via messages sent there.

The name indicated on the FB account does not match the name presented in their Initial Statements.

The name indicated on the FB account has insufficient data to allow for matching when compared to the name presented in their Initial Statements.

This person does not have a criminal background check available.

This person has criminal activity on their criminal background check.

Examples of Neutral Reasons:

This person has not yet confirmed they own a given postal, email or phone address because they have not yet responded to a message sent there.

This person has tested as having this {personality type, disposition, favorite color, gender} by running text analysis across their posts.

Decision Making

A Reputation Report may stand on its own or be considered within the broader context of a Question or set of Questions (as in block 68) for which one seeks Answers (in block 72).

Inputs

Questions (block 68)

A set of one or more inquiries about the person.

Reputation Report (block 62)

As previously described.

Decision Configuration (blocks 64 and 66)

The decision configuration optionally includes but is not limited to:

Reason Importance (block 64)—an importance matrix that describes how important each reason is to the overall answer.

Decision Reasons (block 66)—details about how to use the Reputation Report to create reasons important to the question. At minimum this set of reasons contains the means or methods by which an Answer may be produced for each Question in the set.

Mechanisms & Process

The sub-process of Decision Making defined in FIG. 1A (blocks 64-72) is essentially the art of distilling the evidence into a concrete result or Answer. As a simple example consider these 2 questions:

Question 1: "Will this person repay this loan?"

Question 2: "Is this person qualified to be a plumber?"

Evidence of a person's identity is important because decisions are not useful without confidence that the questions answered are about the person we want to know more about. Because of this questions of identity are generally considered to be of "High" importance when financial security, physical safety or in situations where one is risking something of value. However, different claims, factors and pieces of evidence have different levels of importance in determining the answer to any given Question. When considering the factor "this person has demonstrated that they passed a Plumbing Certification" it is reasonable to decide that it has "Very High Importance" to question 2 and "Low" importance to question 1.

This is just one factor to consider. One could make a decision based upon a wide range of factors and evidence, weighing each differently and aggregating them in a way that can be consumed by the person or system attempting to make a decision.

As suggested earlier, the system may characterize the importance of any factor to the question at hand by assigning a relative weight. This could be done via a quantitative value, an algorithm, formula or as here qualitatively through a coarse grained rating system:

Very Low (VL)—trivial piece of evidence, only a peripheral or second degree relationship to the question/problem at hand.

Low (L)—trivial piece of evidence, marginally related to the question/problem at hand.

Moderate (M)—a relevant piece of evidence related to the question/problem.

High (H)—very strong evidence and relevance to question/problem.

Very High (V)—a definitive piece of evidence that alone represents conclusive or near conclusive evidence related to the question/problem.

As mentioned, importance of any given fact will be relative to the question/problem the Reputation Report is assembled for and is not necessarily related to the confidence ascribed to that factor/reason.

The importance of each factor may be determined via any means and is considered an input to the system and may change/evolve over time as more is learned about the importance of each factor to a given question. These are well suited to qualitative analysis and adjustment, as well as the use of machine learning and artificial intelligence. Equally possible is the use of human judgement in determining importance especially when initially building out mappings of how important factors are for new Questions and problem spaces.

A map of importance values and corresponding factors may be used in any given problem domain to allow the Reputation Model to decide how relevant factors are for the purposes of a given Reputation Report. Further this may be done without need to re-examine the data already derived from Identity Sources—where the confidence levels remain stable assuming no change in those Identity Sources. Additionally it is possible to take a map of importance values to corresponding factors and use it as a starting point for similar domains thus shortening the time required to create an importance map for the new domain.

The Reputation Framework may take inputs having different values of importance. Further different domains may have sets of importance values that are be commonly used to reason about questions in their space. It is possible to simultaneously (AB) test different configurations for importance so that learning can be accelerated. Detachment of these importance factors from the Reputation Model and Reputation Report are important for accelerated learning and for using the Reputation Framework across many domains.

By determining the confidence and importance of each piece of evidence the system is able to provide a framework to guide decision-making. This combination may then be used to create Answers in whatever form is required by the agent consuming the result whether it be prioritized list of facts, a percentage or even a numeric score.

Outputs

Answers (Block 72)

For each Question in the set an Answer that may be in any form including but not limited to: yes/no, true/false, a quantitative score (e.g. 1-100), a qualitative score (e.g. "good", "better", "best").

Answers may be Delivered (block 74) as free-form text, numeric, structured objects, stored in a database, delivered in an email, sms, notification, pub/sub as a programmatic notification (e.g. websockets, webhooks), verbal response, an image or as described below via a graphical user interface.

Reputation Report Delivery—Graphical User Interface Example

Figure 4:
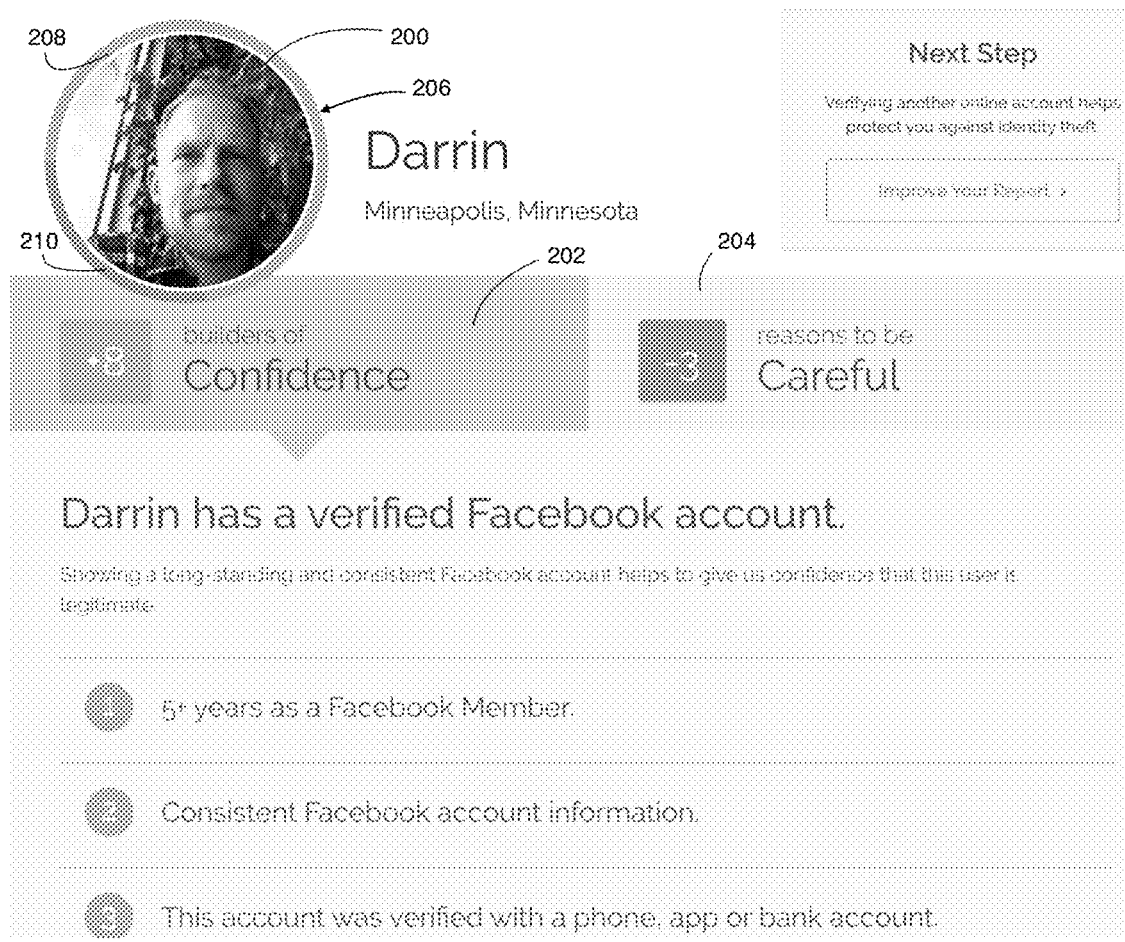
FIGS. 4 and 5 are screenshots showing a graphical user interface for displaying a level of confidence in a person's identity.
Figure 5:
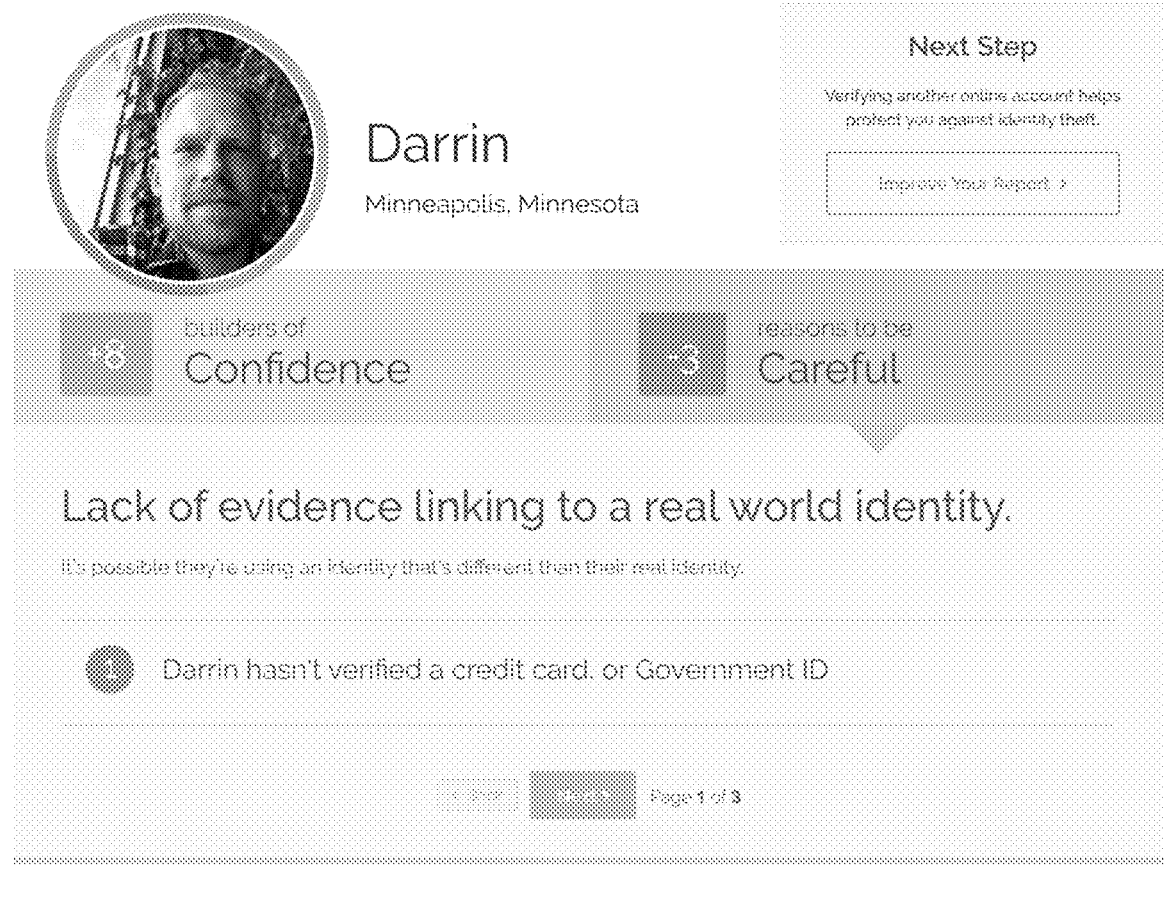

An online representation of the Reputation Report, or the Reputation Display, is shown in FIGS. 4 and 5. In exemplary embodiments, the Reputation Display is viewable on a computer display through an internet browser or a dedicated application.

To provide this visual overview of the person's reputation profile, the system counts the factors considered to be 'builders of confidence' and those considered to be 'reasons to be careful' and represents them on a graphical user interface as numeric first and second scores, respectively. In this particular embodiment, the first score represents the number of factors that tend to affirm the person's identity and the second score represents the number of factors that tend to disaffirm the person's identity.

As an alternative, the first and second scores could represent composite scores in which each factor is given its own weight based on its expected significance in corroborating the person's identity.

As shown, the Reputation Display has a profile image 200 representing the person, and first and second panels 202, 204 located below the profile image 200. As shown, the first and second panels 202, 204 display numerals representing first and second scores for 'builders of confidence' and 'reasons to be careful,' respectively.

As further shown in FIGS. 4 and 5, an annular bar 206, or ring, is provided along the periphery of the profile image 200. The annular bar 206, in some embodiments, completely encircles the profile image 200. As depicted, the ring is composed of two discrete segments 208, 210 that have sizes proportional to the relative magnitudes of the first and second scores, respectively. The annular bar 206 is exemplary only, and other representations are also possible. For example, the same information might be conveyed using a rectangular or otherwise linear bar. Such a representation could also be displayed elsewhere on the Reputation Display and need not touch or surround the profile image 200 as shown in FIG. 4.

Optionally, and as illustrated in FIGS. 4 and 5, a user can click on the first or second panel 202, 204 to see a partial or complete list of the factors that were applied in arriving at the first and second scores.

Data Privacy and Security Considerations

In preferred instances of systems that store sensitive data as in this Identity Framework data security is considered up front to provide the best data protection possible and uses techniques such as: Verify and Discard, One Way Hash, and Unique Unheld Cryptographic Key, Slow but Scalable Storage, and Non-Searchable Storage. Below are the descriptions of each along with the conditions under which they may be used.

Verify and Discard (VaD)

One effective way to ensure that a system is secure from the danger of a data breach is to ensure that sensitive data does not exist within the system. Every piece of data can be scrutinized to understand whether it is needed by the operational system. If it is not needed it is preferably discarded. Within the context of identity, for example, it is important to know that an identity has been verified and perhaps which identity has been verified but it is preferred if the sensitive personal information necessary to facilitate those verifications are not accidentally leaked to others (since this could result in endangering privacy and could result in identity theft). It is therefore advantageous in the case of protecting identity information to verify the identity and discard all pieces of data used in the verification process that are not essential for the operational system. And this can be the first line of defense.

One Way Hash (OWH)

Similar in concept to VaD is the one way hash. This may be used in cases where the system cannot operate without retaining sensitive data.

An advantageous mechanism to handle this case is to apply a one way transformation to the sensitive data so that the system cannot algorithmically, without great difficulty, glean the original value of the data but can easily use a new value to compute a value which may then be compared to the original stored (One Way Hashed) value. A simple example of this might be the use of a CRC or MD5.

Unique Unheld Cryptographic Key (UUCK)

When the system requires sensitive data be retained, the use of encryption is an obvious measure to take but is flawed in the sense that typically the system holds the keys used to unlock the data it is trying to protect. These systems are breached if the keys are leaked to external sources or guessed at which point decryption becomes trivially easy. It is preferable for systems with sensitive data if the keys are not retained locally.

A system that uses DUCK does not hold the keys to access its data—rather the keys are preferentially delivered as close as possible to when the data needs to be accessed and discarded as soon thereafter as possible.

Additionally it is preferential if every piece of data stored is encrypted with a different unique key so that all data is not compromised with the leak of a single key. More granular storage of keys means greater security in the face of brute force attacks as well as the leak of a single key. For every keyed piece of data separate effort is required to decrypt each piece of data in question, vastly magnifying the effort required to open the entire set of data.

Because we store data with discrete unique keys and we do not hold these keys it is both harder to acquire the keys to unlock records and in the absence of having the keys vastly more difficult to decrypt data stored this way without those keys. Brute force methods of decrypting data become infeasible due to the processing power required.

Slow but Scalable Storage

When considering security breaches and access to sensitive data—fast storage allows an infiltrator is more easily able to use brute force attacks to try to guess cryptographic keys. To make a system less susceptible to data breaches a method of storing records that is fast enough for operational use but slow enough to make random guessing non-viable but scalable across many operations. This is similar to how and why best practice password encryption uses a similar approach where best practice is to ensure that any given attempt at a password requires enough time to resolve to make brute force attacks impractical.

This can be done by using intensive encryption that requires time to resolve for every attempt (and that is designed to not benefit from parallel processing or by introducing a delay through a network for example such that each attempt similarly requires time.

Non-Searchable Storage

When considering security breaches in which an attacker gains access to a searchable file system or database—that can be queried or in which one can list all available files. Once a breach occurs on this type of system it is generally easy to extract the records in question so that they can be decrypted en-mass on an attacker's device.

In some embodiments, sensitive data is stored in such a way that it cannot be listed or searched. This forces the attacker to know exactly where each record is located in order to retrieve it. The attacker is faced with one more obstacle prior to being able to access said sensitive data.

Shares

A 'Share' is a document along with a URL or other means that can be passed along to grant others access to a document. In some embodiments, the system allows persons to share information to prove their verification status on a third party site by providing a URL to a page containing that information.

Locking or Protecting a Share

The problem with a 'Share' however—is that anyone can copy that URL and place it on another website claiming it as their own—thereby fraudulently claiming a document that is not theirs. In the case of credentials and identity documents this may results in a fraudulent (but legitimate looking) claim that they are someone they are not.

There are two purposes that a Locked Share helps to satisfy. The first is to protect the information from uninvited guests. This could be because a Share might be posted in a public place or passed along via email or simply because the person sharing a document might want safeguards in place to protect their information.

The second is that the user viewing the Share may desire to have assurances that the Share has not been fraudulently passed along.

Figure 6:
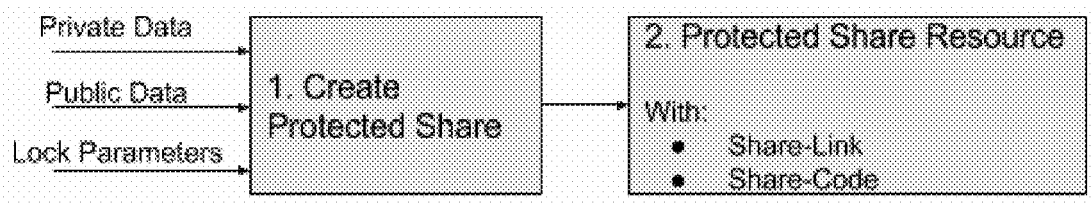
FIG. 6 is a block diagram showing a process of creating a protected share of identity assurance information.

In some embodiments, the system may use a Locked Share to achieve these ends. An exemplary build sequence is represented by the block diagram shown in FIG. 6.

Inputs

Private Data is data that is not made available unless the protected share is unlocked.

Public Data is optionally provided data that is publicly available to anyone with the address to the share whether or not someone has the key to unlock. It is here that any hints or questions related to the 'challenges' are optionally included.

Lock Parameters are parameters required to make a cryptographic or otherwise secure lock and to unlock the same. It is here that the answers to the 'challenges' are encoded.

Mechanisms & Process

The system assembles through any means the Private Data and Public Data to be shared. The Lock Parameters are provided describing how the share will be stored, encrypted, accessed and the like. The system takes this information and produces a Protected Shared Resource as described below.

In preferred implementations the answers to the challenges are not available separately but rather are a fundamental part of the unlocking process. E.g. they are taken together to help build the key to the lock.

Outputs

Protected Shared Resources—contains a share link (e.g. a URL or file location) and a share-code which is provided as an alternate means to get to the shared document. A share-link is intended to be used in a graphical user interface, device or accessible via a secure API. The share-code is optional and generated by system to lock the Share before 'challenge' questions (discussed below).

One example of how this might be used is to share a Reputation Report. When building the Share the system may share limited information in the Public Data —displaying limited details to the public and veiling the person's photo as well as unnecessary personal details. This allows the system to display on an Unlock page enough detail to understand at a high level what will be available once the system is unlocked. The system may show the entire Reputation Report once unlocked because the Private Data may include the Reputation Report.

Accessing a Locked 'Share'

Figure 7:
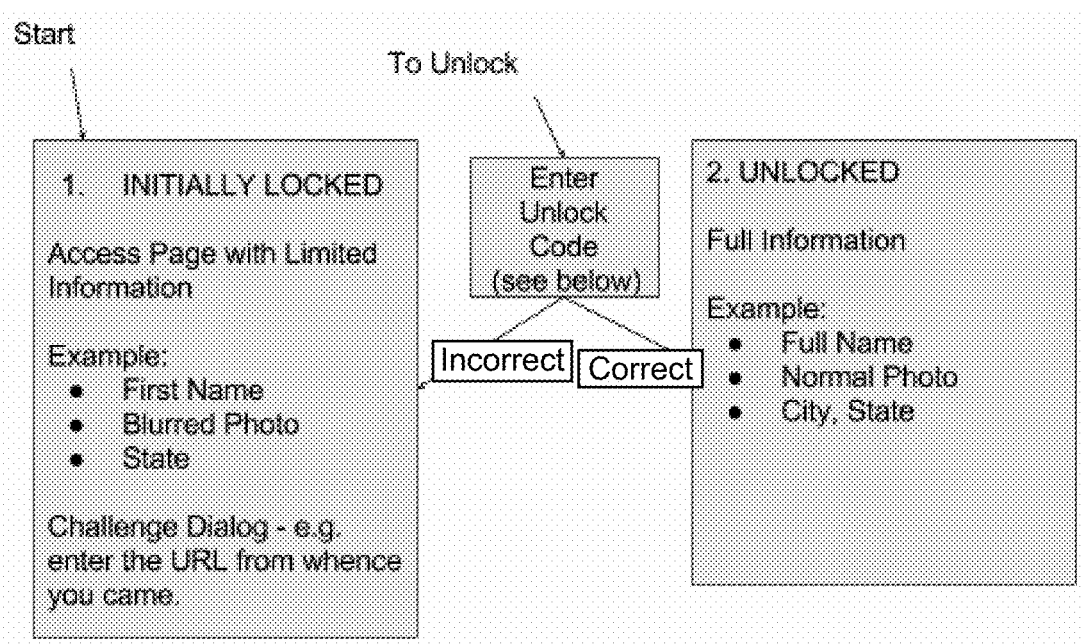
FIG. 7 is a block diagram showing a process of obtaining access to a protected share of identity assurance information.

For the user trying to access a Share the high-level process proceeds according to FIG. 7. The User follows share-link and sees a public version of the shared page. The User generally starts on the left side of the diagram (block 1) and executes the steps outlined below:

1) As in block 1: A prominent part of this page is an unlock challenge. This challenge generally comes in the form of a question for which one or more answers may be correct. The public version of the shared page may tell the users attempting access that the page is locked and provide a question for them to unlock the page, essentially prompting them to enter the correct response to the challenge.
   a. Examples of challenges might be:
      i. A predefined statement or question: "Please enter my favorite stanza from my favorite Mother Goose rhyme." And answers might be in this form:
         1. a passphrase: "Mary had a little lamb."
         2. a set of valid passphrases: "Mary had a little lamb.", "Her fleece was white as snow."
      ii. The answer to a dynamically created problem: e.g. "What is 3+4?" where the answers would be "7" or "seven".
      iii. A fact known to the user that can be automatically generated by the user. Some examples might be:
         1. "Enter your email address—the email address this invitation was sent to," where the answer would be their address: e.g., sam@example.com.
         2. "Copy and paste the website URL where you found this link to continue," where the answer would be the page the share-link was built for e.g., https://somedomain.org/my/page.
      iv. A Share Code (as discussed below) in which case the challenge might take the form: "Please enter the code for this share." The proper answer is the Share Code.
2) As in block 2: The user enters the answer to the challenge(s) and if correct unlock the profile showing more detailed information. Otherwise the process optionally repeats some number of times.

Continuing the example described earlier—the user wishing to view a person's Reputation Report may follow a Share-Link to arrive at a locked Share. They will arrive at a page that optionally supplies a limited subset of information about the person along with a challenge dialog/sequence. The viewer supplies answers to one or more challenges to unlock the Share. When successful the viewer is granted access to the Private Data stored in the Share (the Reputation Report). As indicated in FIG. 7, full information can then be viewed, which may include for example the person's full name, non-obscured photo, and city and state information.

If the incorrect unlock code is entered, the user may be denied access to the full information, as shown in FIG. 7. Preferred implementations of this might limit the number of attempts in some way—per given time period, to a total number of retries and further might forward a security warning for every access or failed attempt.

User interaction via a User Interface is the preferred method of allowing this but an Application Programming Interface may be allowed to programmatically execute the same sequence.

Share-Links

In the most general sense, a 'share-link' is a URL (aka Universal Resource Locator) that provides enough information to get to a protected share from any graphical user interface. Share links may come in the form of images or buttons associated with an underlying URL that links to the protected resource. Any resource that links to the protected resources is considered a share-link.

Share-Codes

Each technique above that produces a share-link also produces a 'share code' for sites that will not allow URLs or have specific interface requirements. These are generally alphanumeric and may be added to any location in a controlled page that allows alphanumeric text. For example, if the share code was '17171788181717y21'—a user whose identity is in question might add 'Code: 17171788181717y21' to indicate that a web site or web page they control is associated with a given Reputation Model. The Share-Code can be configured to limit the types and number of characters used to allow the code to be more easily used in different contexts.

A specific example of how this share code could be used follows: if the person wants to indicate they own a Match.com user profile—they could request that the system generate a share code. They may then alter their profile on Match.com to include the code. The system may then confirm that the person owns (or at least as the ability to change) that page by reading the share code on that page that person is claiming.

In this case, users wanting to see the profile are sent to a landing page where they are asked to enter the share-code, which then directs them to the unlock sequence diagrammed in FIG. 7.

Considerations when Building Locked Shares

Regardless of approach to used to create a share, to be useful, the person trying to share a document may demand the ability to safely post or otherwise pass along the share-link or share-code in the medium in which it is intended to be shared. In some embodiments, the person has sole control of the page or location in which they may post a share. In other embodiments, the system can prove the share was generated for the given page, but the Share could be from anyone that has write access to the page.

A number of different techniques can be used to build a 'Protected Share' resource in order to protect resources and shares with different characteristics and to prove ownership of the Share.

Locations with Unique Long Standing URLs

These methods can work for sites that have unique long standing URLs. If some portion of the URL is unique and consistent the site can be guaranteed secure for this location. This is done by creating a Share where one of the 'challenge' questions asks the user to provide (e.g. cut/paste) the URL where the Share was found. The correct answer is the original URL where the share was posted. In essence the share is protected from theft by re-location by ensuring that one of the challenges includes the original location. In this case the share can be copied but would fail to be unlocked and therefore rendered useless in an alternate location.

The unique 'share-link' and optional 'share-code' created for this Protected Share may be used to share the document. This same technique may be applied to other long standing locations and more generally to long standing attributes (see below).

Locations with a Unique Long-Standing Attribute

Analogous to the use of the long standing URL above—another approach is to use a unique attribute over which the person sharing is known to have control. Examples include:

email, phone number, usernames, user ID, personal identification numbers, driver's license numbers, and license plate numbers.

After the person provides the attribute they claim they control/own they are again provided with a share-link and optionally a share-code that can be shared via the medium sensible for that attribute.

For example, an email address lock will generate a share-link that may be shared via email (e.g. in a signature line) so that when they send an email from this account —persons receiving email may see their Reputation Model and unlock it by typing in the email address they received the email from.

Custom Challenge Based Lock

Another approach is to secure the share with a challenge. In this case the owner chooses one or more challenge phrase(s) and matching keys. Both the challenge and the key can be either user-defined or predefined by the system. The system provides a share-link that will display the chosen challenge when a user opens the share link. To unlock the user has answer the challenge(s) with the same key(s) used to create the lock.

This type of lock can be location independent, and while it is a viable method it neither means that the lock cannot be moved to a new location nor that the shared document is tied to that location.

Rather this type of challenge is best used with an app, email or SMS delivery of the answer to confirm that the appropriate person is accessing the share.

An example is as follows:

| Challenge | Key |
|---|---|
| What's my favorite color? | Blue |
| What's my home city? | Minneapolis |

Another approach is to allow the sharer to approve each request to see their profile through a notification in an application, which might come in the form of a text message, email or application notification such as: "<accessor> has requested access to see your reputation report." Along with buttons to allow or deny access on a case by case basis. This form might be used for reports that contain more complete or sensitive information.

Additional/Compound Challenges

Some persons seeking to share their identity prefer to add additional challenges for certain shares. This can be done for any lock type described herein and any number of additional challenges may be added. To unlock, each challenge is presented to the user and must be answered correctly to proceed, as described in the Custom Challenge section above.

EMBODIMENTS

Additional exemplary embodiments are presented below. The order in which they are listed is not representative of their order of importance.

Embodiment 1 provides a computer-implemented method of assuring a person's identity comprising the steps of: receiving one or more identifying statements about the person; receiving from the person authorization to access one or more identity sources on which the person is registered; extracting data from the one or more identity sources to corroborate the one or more identifying statements; and aggregating the data to provide first and second scores, the first score representing factors that tend to affirm the person's identifying statements and the second score representing factors that tend to disaffirm the person's identifying statements.

Embodiment 2 provides the method of embodiment 1, further comprising displaying the first and second scores in a graphical user interface.

Embodiment 3 provides the method of embodiment 1 or 2, wherein the one or more identity sources comprise a social networking site.

Embodiment 4 provides the method of any one of embodiments 1-3, wherein the one or more identity sources comprise a professional networking site.

Embodiment 5 provides the method of any one of embodiments 1-4, wherein the one or more identity sources include a plurality of identity sources.

Embodiment 6 provides the method of any one of embodiments 1-5, wherein the one or more identifying statements reflect the person's legal identity, financial identity, social identity, community identity or combination thereof.

Embodiment 7 provides the method of any one of embodiments 1-6, wherein the one or more identifying statements reflect one or more of the following factors: name, birthdate, home address, work address, home town, and physical appearance.

Embodiment 8 provides the method of any one of embodiments 1-7, wherein the data extracted from the one or more identity sources reflect the person's legal identity.

Embodiment 9 provides the method of any one of embodiments 1-8, wherein the data extracted from the one or more identity sources reflect the person's financial identity.

Embodiment 10 provides the method of any one of embodiments 1-9, wherein the data extracted from the one or more identity sources reflect the person's social identity.

Embodiment 11 provides the method of any one of embodiments 1-10, further comprising the step of establishing confidence in the person's ownership of identity.

Embodiment 12 provides the method of embodiment 11, wherein establishing confidence in the person's ownership of identity comprises obtaining a biological or physical identifier.

Embodiment 13 provides the method of embodiment 12, wherein the biological or physical identifier includes a facial profile, retinal scan, fingerprint, or combination thereof.

Embodiment 14 provides the method of any one of embodiments 11-13, wherein establishing confidence in the person's ownership of identity comprises verifying the person's ability to log into an email account, social network account, or other secured account.

Embodiment 15 provides the method of any one of embodiments 11-14, wherein establishing confidence in the person's ownership of identity comprises verifying the person has control over a personal device.

Embodiment 16 provides the method of embodiment 15, wherein the personal device is a cellular phone or personal computer.

Embodiment 17 provides the method of any one of embodiments 11-16, wherein establishing confidence in the person's ownership of identity comprises verifying the person's ability to recall personal information.

Embodiment 18 provides the method of any one of embodiments 1-17, wherein the one or more identifying statements reflect the person's legal identity and corroborating the one or more identifying statements comprises obtaining verification of the legal identity through a third party verification service.

Embodiment 19 provides the method of any one of embodiments 1-18, wherein the one or more identifying statements reflect the person's social identity and corroborating the one or more identifying statements comprises observing the person's ability to login to a social network.

Embodiment 20 provides the method of any one of embodiments 1-19, wherein the one or more identifying statements reflect the person's social identity and corroborating the one or more identifying statements comprises observing details of the person on a social network that are consistent with the one or more identifying statements.

Embodiment 21 provides the method of any one of embodiments 1-20, wherein the one or more identifying statements reflect the person's social identity and corroborating the one or more identifying statements comprises observing activity by the person on a social network.

Embodiment 22 provides the method of any one of embodiments 1-21, wherein the one or more identifying statements reflect the person's social identity and corroborating the one or more identifying statements comprises observing the person's interest in posted activities from connections and/or friends on a social network.

Embodiment 23 provides the method of any one of embodiments 1-22, wherein the one or more identifying statements reflect the person's financial identity and corroborating the one or more identifying statements comprises verifying the person receives a charge or payment to a financial account, or otherwise has the ability to access the financial account.

Embodiment 24 provides the method of any one of embodiments 1-23, wherein the one or more identifying statements reflect the person's community identity and corroborating the one or more identifying statements comprises accessing a client site via opt-in from the person; and verifying that community data matches the one or more identifying statements.

Embodiment 25 provides the method of any one of embodiments 1-24, wherein the one or more identifying statements reflect the person's location and corroborating the one or more identifying statements comprises verifying that the person receives a mailing within a pre-determined period of time.

Embodiment 26 provides the method of any one of embodiments 1-25, wherein the one or more identifying statements reflect the person's location and corroborating the one or more identifying statements comprises verifying that the person is physically present at the location.

Embodiment 27 provides the method of any one of embodiments 1-26, wherein the one or more identifying statements reflect an email address belonging to the person and corroborating the one or more identifying statements comprises verifying that the person responds from the email address within a pre-determined period of time.

Embodiment 28 provides the method of any one of embodiments 1-27, wherein the one or more identifying statements reflect the person's short message service (SMS) account and corroborating the one or more identifying statements comprises verifying that the person responds from the SMS account within a pre-determined period of time.

Embodiment 29 provides the method of any one of embodiments 1-28, wherein the one or more identifying statements reflect a phone number belonging to the person and corroborating the one or more identifying statements comprises verifying that the person answers a call to the phone number and can confirm personal information within a pre-determined period of time.

Embodiment 30 provides the method of any one of embodiments 1-29, wherein the data from the one or more identity sources comprises a third party review of the person on the one or more identity sources.

Embodiment 31 provides the method of any one of embodiments 1-30, wherein the data from the one or more identity sources comprises a location log from a posting by the person on the one or more identity sources.

Embodiment 32 provides the method of any one of embodiments 1-31, wherein the data from the one or more identity sources comprises analysis of the person's behavior based on a posting by the person on the one or more identity sources.

Embodiment 33 provides the method of any one of embodiment 1-32, aggregating the data further comprises the step of adjusting the first or second score based on a credit rating of the person from a credit agency.

Embodiment 34 provides the method of any one of embodiments 1-33, wherein the first and second scores are defined as the number of factors identified that tend to affirm or disaffirm the person's identity, respectively.

Embodiment 35 provides a computer-implemented method of displaying a person's identity comprising the steps of: using the method of any one of embodiments 1-34 to obtain first and second scores, the first score representing the number of factors that tend to affirm the person's identity and the second score representing the number of factors that tend to disaffirm the person's identity; representing the scores in a graphical user interface comprising: optionally, a profile image representing the person; and a graphical representation of the first and second scores.

Embodiment 36 provides the method of embodiment 35, wherein the graphical representation comprises first and second panels displaying numerals representing the first and second scores.

Embodiment 37 provides the method of embodiment 35, wherein the graphical representation comprises a list of the factors.

Embodiment 38 provides the method of any one of embodiments 35-37, wherein the graphical user interface further comprises an annular bar disposed around the profile image, the annular bar divided into first and second sections, wherein the first and second sections have sizes proportional to the relative magnitudes of the first and second scores, respectively.

Embodiment 39 provides the method of any one of embodiments 35-38, wherein the data is based on one or more community sites to which the person belongs.

Embodiment 40 provides the method of embodiment 36, wherein the one or more community sites comprise a social networking site, professional networking site, or combination thereof.

Embodiment 41 provides the method of embodiment 39 or 40, wherein the one or more community sites includes at least three community sites.

Embodiment 42 provides the method of any one of embodiments 35-41, wherein the factors are based on comparing the data to the person's legal identity, financial identity, social identity, community identity, or combination thereof.

Embodiment 43 provides the method of any one of embodiments 35-42, wherein the panels are rectangular and located side-to-side in the graphical user interface.

Embodiment 44 provides the method of any one of embodiments 35-43, wherein clicking on the first or second panel causes the graphical user interface to reveal a list of the enumerated factors corresponding to the first or second score, respectively.

Embodiment 45 provides the method of embodiment 44, wherein the list is a partial list.

Embodiment 46 provides the method of embodiment 44, wherein the list is a complete list.

Embodiment 47 provides an application programming interface for carrying out the method of any one of embodiments 1-46.

Embodiment 48 provides a computer system comprising: a graphical user interface for displaying a level of confidence in a person's identity, the graphical user interface comprising: optionally, a profile image representing the person; and a graphical representation of respective first and second scores obtained using the method of any one of claims 1-34, the first score representing the number of factors that tend to affirm the person's identity and the second score representing the number of factors that tend to disaffirm the person's identity.

The preceding description, given in order to enable one of ordinary skill in the art to practice the claimed disclosure, is not to be construed as limiting the scope of the disclosure, which is defined by the claims and all equivalents thereto.

What is claimed is:

1. A computer-implemented method of obtaining an identity assurance, the method comprising the steps of:
   receiving one or more identifying statements about a person;
   verifying the person's ability to log into an email account, social network account, or other secured online account;
   receiving from the person authorization to access a plurality of identity sources on which the person is registered including the email account, social network account, or other secured online account, wherein the identity sources are directed to two or more of: legal identity, financial identity, and social identity;
   based on authorization, extracting data from the plurality of identity sources using a computer processor to corroborate the one or more identifying statements, the data for at least some of the identity sources being extracted through the internet;
   aggregating the data using the computer processor to provide first and second scores, the first score representing factors that tend to affirm the person's identifying statements and the second score representing factors that tend to disaffirm the person's identifying statements, wherein the identifying statements are related to the person's identity and/or location; and
   displaying a representation of the first and second scores in a graphical user interface to provide the identity assurance.

2. The computer-implemented method of claim 1, wherein the one or more sources comprise a social networking site.

3. The computer-implemented method of claim 1, wherein the one or more identifying sources comprise a professional networking site.

4. The computer-implemented method of claim 1, wherein the one or more identifying statements reflect the person's legal identity, financial identity, social identity, community identity or combination thereof.

5. The computer-implemented method of claim 1, wherein establishing confidence in the person's ownership of identity further comprises one or more of: obtaining a biological or physical identifier, verifying the person has control has control over a personal device, and verifying the person's ability to recall personal information.

6. The computer-implemented method of claim 1, wherein corroborating the one or more identifying statements comprises one or more of: obtaining verification of the identity through a third party verification service, observing the person's ability to log in to a social network, observing details of the person on a social network that are consistent with the one or more identifying statements, observing activity by the person on a social network, observing the person's interest in posted activities from connections and/or friends on a social network, verifying the person receives a charge or payment to a financial account, or otherwise has the ability to access the financial account, accessing a client site via opt-in from the person followed by verifying that community data matches the one or more identifying statements, verifying that the person receives a mailing within a pre-determined period of time, verifying that the person is physically present at the location, verifying that the person responds from the email address within a pre-determined period of time.

7. The computer-implemented method of claim 1, wherein the one or more identifying statements reflect the person's short message service (SMS) account and corroborating the one or more identifying statements comprises verifying that the person responds from the SMS account within a pre-determined period of time.

8. The computer-implemented method of claim 1, wherein the one or more identifying statements reflect a phone number belonging to the person and corroborating the one or more identifying statements comprises verifying that the person answers a call to the phone number and can confirm personal information within a pre-determined period of time.

9. The computer-implemented method of claim 1, wherein the data from the one or more identity sources comprises one or more of: a third party review of the person on the one or more identity sources, a location log from a posting by the person on the one or more identity sources, analysis of the person's behavior based on a posting by the person on the one or more identity sources.

10. The computer-implemented method of claim 1, wherein the first and second scores are defined as the number of factors identified that tend to affirm or disaffirm the person's identity, respectively.

11. The computer-implemented method of claim 1, wherein the graphical representation comprises first and second panels displaying numerals representing the first and second scores.

12. The computer-implemented method of claim 11, wherein the panels are rectangular and located side-to-side in the graphical user interface.

13. The computer-implemented method of claim 1, wherein the graphical representation comprises a list of the factors.

14. The computer-implemented method of claim 1, wherein the computer processor assigns different relative weights to the data extracted from the identity sources according to relative importance.

15. The computer-implemented method of claim 14, wherein the identity assurance is being used to answer a question, and the relative weights assigned by the computer processor are dependent on the question.

16. The computer-implemented method of claim 1, wherein the identity sources include both an online and offline identity source.

17. The computer-implemented method of claim 1, wherein the identity source is based on a bank statement, utility bill, credential, certificate, or government issued document.

18. The computer-implemented method of claim 1, wherein the identity sources include an online identity source, and further comprising the step of using Open Authorization (OAUTH) to extract data from the online identity source.

19. The computer-implemented method of claim 1, wherein aggregating the data further comprises the step of adjusting the first or second score based on a credit rating of the person from a credit agency.

\* \* \* \* \*